US012073250B2

(12) United States Patent
Jiang et al.

(10) Patent No.: US 12,073,250 B2
(45) Date of Patent: Aug. 27, 2024

(54) DETERMINING MEMORY REQUIREMENTS FOR LARGE-SCALE ML APPLICATIONS TO FACILITATE EXECUTION IN GPU-EMBEDDED CLOUD CONTAINERS

(71) Applicant: Oracle International Corporation, Redwood Shores, CA (US)

(72) Inventors: Wei Jiang, Newcastle, WA (US); Guang C. Wang, San Diego, CA (US); Kenny C. Gross, Escondido, CA (US)

(73) Assignee: Oracle International Corporation, Redwood City, CA (US)

( * ) Notice: Subject to any disclaimer, the term of this patent is extended or adjusted under 35 U.S.C. 154(b) by 666 days.

(21) Appl. No.: 17/318,795

(22) Filed: May 12, 2021

(65) Prior Publication Data

US 2022/0365820 A1    Nov. 17, 2022

(51) Int. Cl.
*G06F 9/50* (2006.01)
*G06F 9/455* (2018.01)
*G06N 20/00* (2019.01)

(52) U.S. Cl.
CPC ........ *G06F 9/5016* (2013.01); *G06F 9/45558* (2013.01); *G06F 9/5044* (2013.01); *G06N 20/00* (2019.01); *G06F 2009/4557* (2013.01); *G06F 2009/45591* (2013.01)

(58) Field of Classification Search
None
See application file for complete search history.

*Primary Examiner* — Adam Lee
(74) *Attorney, Agent, or Firm* — Kilpatrick Townsend & Stockton LLP

(57) ABSTRACT

We disclose a system that executes an inferential model in VRAM that is embedded in a set of graphics-processing units (GPUs). The system obtains execution parameters for the inferential model specifying: a number of signals, a number of training vectors, a number of observations and a desired data precision. It also obtains one or more formulae for computing memory usage for the inferential model based on the execution parameters. Next, the system uses the one or more formulae and the execution parameters to compute an estimated memory footprint for the inferential model. The system uses the estimated memory footprint to determine a required number of GPUs to execute the inferential model, and generates code for executing the inferential model in parallel while efficiently using available memory in the required number of GPUs. Finally, the system uses the generated code to execute the inferential model in the set of GPUs.

19 Claims, 7 Drawing Sheets

DETERMINING MEMORY REQUIREMENTS FOR LARGE-SCALE ML APPLICATIONS TO FACILITATE EXECUTION IN GPU-EMBEDDED CLOUD CONTAINERS

BACKGROUND

Field

The disclosed embodiments generally relate to techniques for using machine-learning (ML) models to perform classification operations. More specifically, the disclosed embodiments relate to a technique for determining memory usage requirements for a large-scale machine-learning (ML) application to support execution in graphics-processing unit (GPU)-embedded cloud containers.

Related Art

Large numbers of sensors are presently being deployed to monitor the operational health of critical assets in a large variety of business-critical systems. For example, a medium-sized computer data center can include over 1,000,000 sensors monitoring thousands of servers, a modern passenger jet can include 75,000 sensors, an oil refinery can include over 1,000,000 sensors, and even an ordinary car can have over 100 sensors. These sensors produce large volumes of time-series sensor data, which can be used to perform prognostic-surveillance operations to facilitate detecting incipient anomalies. This makes it possible to take remedial action before the incipient anomalies develop into failures in the monitored assets.

ML techniques are commonly used to perform prognostic-surveillance operations on time-series sensor data, and also for validating the integrity of the sensors themselves. ML-based prognostic-surveillance techniques typically operate by training an ML model (also referred to as an "inferential model") to learn correlations among time-series signals. The trained ML model is then placed in a surveillance mode where it used to predict values for time-series signals based on the correlations with other time-series signals, wherein deviations between actual and predicted values for the time-series signals trigger alarms that indicate an incipient anomaly. This makes it possible to perform remedial actions before the underlying cause of the incipient anomaly leads to a catastrophic failure.

For "big data" ML use cases involving hundreds or thousands of Internet of Things (IoT) sensor signals, one of the main computational challenges is the fact that the peak memory utilization scales with the square of the number of sensors. This can pose a substantial challenge when it comes to sizing "cloud container shapes," which provide configurations for central processing units (CPUs) and/or graphics processing units (GPUs) in cloud containers, which are available to end customers. The memory footprint requirement of a given ML use case is not simply equivalent to the size of the original dataset. In fact, it is the peak memory footprint, which evolves from the original dataset, that determines the memory capacity requirement (i.e., RAM for CPU computing, and VRAM for GPU computing).

The required memory footprint needs to be much bigger than the size of the original dataset because a large number of intermediate variables are produced during execution of an ML system. This is because for most ML use cases, the training operation scales roughly with the square of the number of signals being analyzed. This is problematic because without knowing the peak memory usage, one is likely to encounter out-of-memory (OOM) events. Although this problem can be mitigated with very conservative pre-allocation of RAM, this is likely to cause an unnecessary underutilization of memory resources.

Moreover, for a GPU-embedded cloud container, allocating the on-board VRAM between multiple GPUs is not as simple as sizing the CPU shape, because the added VRAM cannot be treated as contiguous shareable memory. Additional parallel programming is required to utilize all available VRAM. Thus, advanced knowledge of the required peak memory utilization makes it possible to efficiently execute use cases that involve GPU-embedded cloud containers.

Note that it is possible to perform a Monte Carlo simulation for the ML system to determine peak memory utilization over a range of different execution parameters, such as number of signals, number of training vectors, and required precision. However, Monte Carlo simulations are extremely time-consuming and also consume significant computing resources.

Hence, what is needed is a technique for determining peak memory usage for an ML system without the computational cost involved in performing Monte Carlo simulations.

SUMMARY

The disclosed embodiments relate to a system that executes an inferential model in VRAM that is embedded in a set of graphics-processing units (GPUs). During operation, the system obtains execution parameters for the inferential model specifying: a number of signals, a number of training vectors, a number of observations and a desired data precision. The system also obtains one or more formulae for computing memory usage for the inferential model based on the execution parameters. Next, the system uses the one or more formulae and the execution parameters to compute an estimated memory footprint for the inferential model. The system then uses the estimated memory footprint to determine a required number of GPUs to execute the inferential model, and generates code for executing the inferential model in parallel while efficiently using available memory in the required number of GPUs. Finally, the system uses the generated code to execute the inferential model in the set of GPUs.

In some embodiments, the one or more formulae comprise formulae for determining memory usage during one or more of the following operations: loading training data for the inferential model; characterizing signal dynamics for the inferential model; solving a regression for the inferential model; and evaluating the inferential model.

In some embodiments, the inferential model comprises one of the following: a kernel regression model; a linear regression model; and a multivariate state estimation technique (MSET) model.

In some embodiments, while obtaining the one or more formulae for memory usage, the system determines the formulae by performing curve-fitting operations based on scatter plots of memory usage for different executions of the inferential model based on different execution parameters.

In some embodiments, while generating the code for executing the inferential model, the system generates parallel code that executes the inferential model in parallel on multiple GPUs in the set of GPUs.

In some embodiments, the inferential model is executed using GPU-embedded cloud containers on a cloud computing platform that provides the set of GPUs.

In some embodiments, while executing the inferential model, during a training mode, the system trains the inferential model using the training data, which comprises time-series signals received from a monitored system. Next, during a surveillance mode, the system uses the trained inferential model to generate estimated values for time-series signals in surveillance data from the monitored system based on cross-correlations between the time-series signals in the surveillance data. Next, the system performs pairwise differencing operations between actual values and the estimated values for the time-series signals in the surveillance data to produce residuals. Finally, the system analyzes the residuals to detect the incipient anomalies in the monitored system.

In some embodiments, analyzing the residuals involves performing a sequential probability ratio test (SPRT) on the residuals to produce SPRT alarms, and then detects the incipient anomalies based on the SPRT alarms.

In some embodiments, detecting the incipient anomalies in the monitored system comprises detecting an impending failure of the monitored system, or a malicious-intrusion event in the monitored system.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Exemplary Prognostic-Surveillance System

Figure 1:
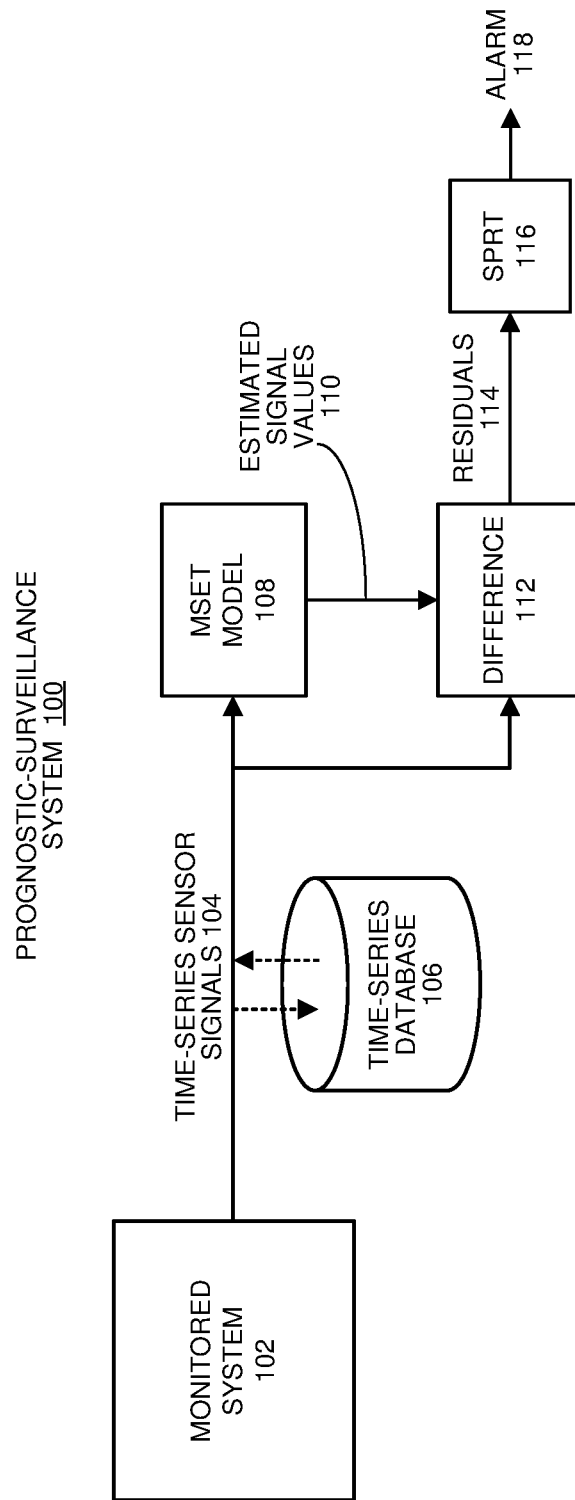
FIG. 1 illustrates an exemplary prognostic-surveillance system in accordance with the disclosed embodiments.

Before describing our memory requirement determination technique further, we first describe a prognostic-surveillance system in which the technique can be used. FIG. 1 illustrates an exemplary prognostic-surveillance system 100 that accesses a time-series database 106, containing time-series signals in accordance with the disclosed embodiments. As illustrated in FIG. 1, prognostic-surveillance system 100 operates on a set of time-series sensor signals 104 obtained from sensors in a monitored system 102. Note that monitored system 102 can generally include any type of machinery or facility, which includes sensors and generates time-series signals. Moreover, time-series signals 104 can originate from any type of sensor, which can be located in a component in monitored system 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from monitored system 102 or from time-series database 106 into a multivariate state estimation technique (MSET) pattern-recognition model 108. Although it is advantageous to use an inferential model, such as MSET, for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses." *Annals of Mathematical Statistics.* 16 (2): 117-186.) In this way, prognostic-surveillance system 100 can proactively alert system operators to incipient anomalies, such as impending failures, hopefully with enough lead time so that such problems can be avoided or proactively fixed.

Figure 2:
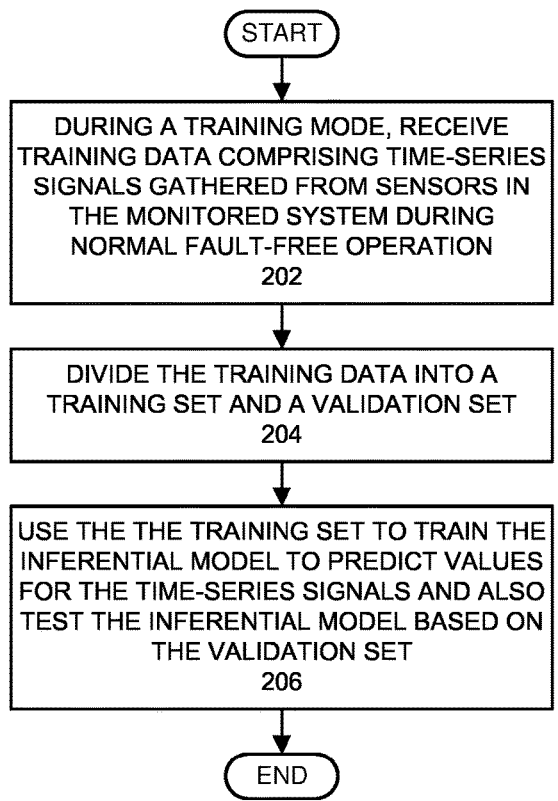
FIG. 2 presents a flow chart illustrating a process for training an inferential model in accordance with the disclosed embodiments.
Figure 3:
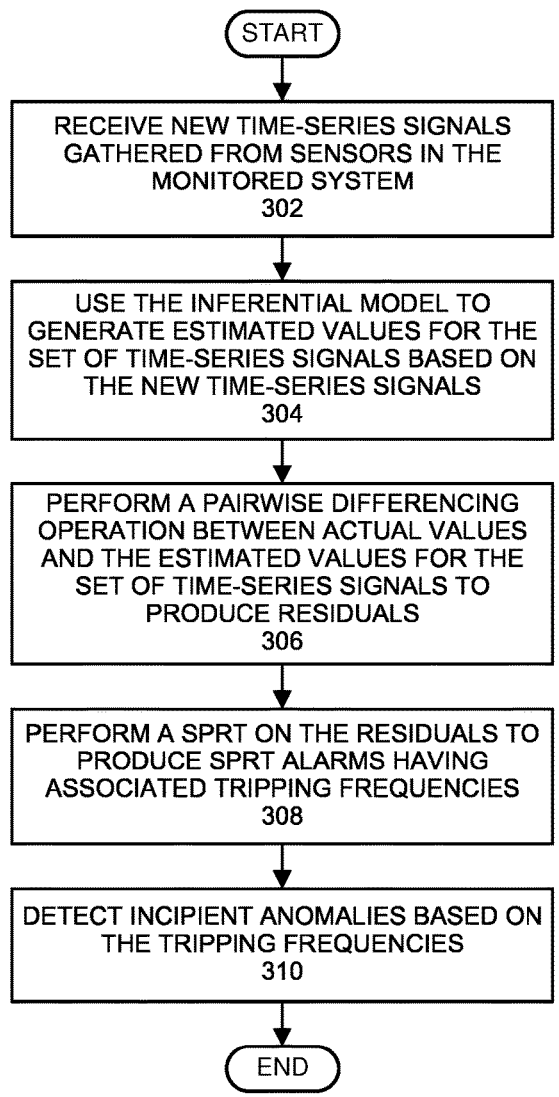
FIG. 3 presents a flow chart illustrating a process for using an inferential model to perform prognostic-surveillance operations in accordance with the disclosed embodiments.

The prognostic surveillance system 100 illustrated in FIG. 1 operates generally as follows. During a training mode, which is illustrated in the flow chart in FIG. 2, the system receives a training set comprising time-series signals gathered from sensors in the monitored system under normal fault-free operation (step 202). Next, the system divides the training data into a training set and a validation set (step 204). The system then trains the inferential model to predict values of the time-series signals based on the training set, and also tests the inferential model based on the validation set (step 206). During a subsequent surveillance mode, which is illustrated by the flow chart in FIG. 3, the system receives new time-series signals gathered from sensors in the monitored system (step 302). Next, the system uses the inferential model to generate estimated values for the set of time-series signals based on the new time-series signals (step 304). The system then performs a pairwise differencing operation between actual values and the estimated values for the set of time-series signals to produce residuals (step 306). The system then analyzes the residuals to detect the incipient anomalies in the monitored system. This involves performing a SPRT on the residuals to produce SPRT alarms with associated tripping frequencies (step 308), and then detecting incipient anomalies based on the tripping frequencies (step 310). Note that these incipient anomalies can be associated with an impending failure of the monitored system, or a malicious-intrusion event in the monitored system.

Discussion

Figure 4:
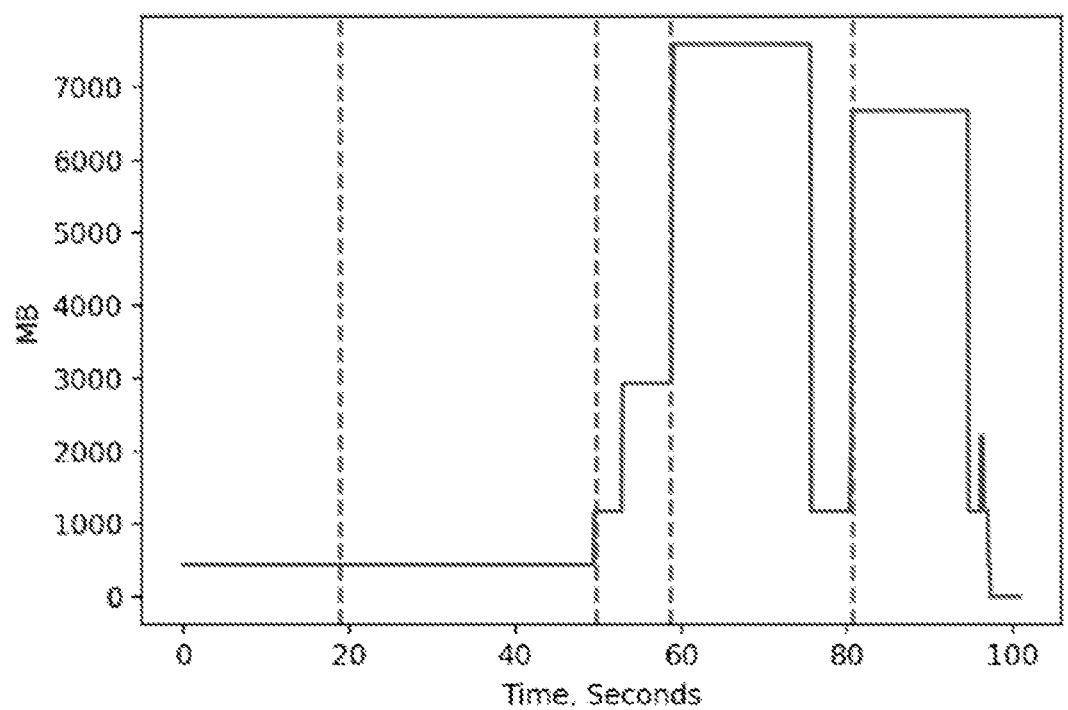
FIG. 4 presents a graph of a memory utilization profile for a typical ML use case in accordance with the disclosed embodiments.

One challenge for deploying large-scale ML applications in a cloud environment, wherein cloud containers are populated with various shape configurations, is to perform appropriate container sizing regarding RAM and/or VRAM capacity. It would seem that, for a given ML application, the size of the customer's data determines the memory usage requirement. However, that is often not the case because ML techniques need to produce and access a large number of intermediate variables before determining their final results. This process generally scales quadratically with the square of the number of signals involved in the ML use case. The memory utilization requirement for a given ML technique and customer dataset depends on the memory footprint at the peak time, when most variables are derived from the original dataset. FIG. 4 illustrates this challenge by providing a graph of a real example. In this example, the initial dataset for the ML training only requires 400 MB of memory. However, memory usage quickly increases with various training procedures and can easily reach 7300 MB, which is the required memory capacity for this specific ML use case.

In practice, it is challenging for end customers or ML users to discover this peak memory usage without performing trial-and-error executions to produce a memory utilization profile similar to FIG. 4. A conventional Monte Carlo (MC) based simulation, which computes a parametric function of the number of signals and observations, is helpful for scoping memory utilization. It starts with a small problem scale and derives a memory utilization surface through a grid search, from which the memory requirement for even larger-scale problems can be inferred. However, this kind of exhaustive experimental approach requires a significant amount of time to complete. More importantly, sufficient RAM is required in the first place to be able to run the simulation for assessing the peak memory utilization for the problem scale of interest. Alternatively, one can pre-allocate the RAM capacity of the VM in a very conservative manner, which means more memory resources than necessary are used.

In addition, this solution will not work well with GPU-based computing systems. A typical high performance GPU comes with 16 GB of embedded VRAM and once that embedded VRAM to the GPU is exceeded, one cannot simply add more VRAM modules to make it bigger (as is the case with adding DIMMs in a server). It is necessary to add more GPUs or GPU-embedded containers, and the extra VRAM provided by adding more GPUs cannot be simply treated as contiguous sharable memory because each GPU has its own address space. Special code must be written to effectively utilize this VRAM during parallel execution of multiple GPUs.

What is needed is a systematic analytical technique for inferring peak memory usage for specific ML use cases, without requiring supporting MC simulations or aggressive trial-and-error memory pre-allocation experiments, which are time-consuming and may require more than the available computing resources at the time of the assessment. It is advantageous for the peak memory footprint for an ML use case to be quickly, autonomously, and accurately estimated prior to runtime, so that if the problem needs to be split across multiple GPUs, the shape of the corresponding cloud container can be optimally configured prior to ML computations.

We have developed a memory-sizing formularization technique for scoping the shape of a cloud container, which provides an accurate estimation for the peak memory usage for a use case prior to actual ML model execution. It offers accurate scoping capability for deterministic ML techniques, and the methodology can also be modified for other heuristic-based techniques. This memory-sizing technique can save the substantial effort that ML users previously had to invest in pre-allocating enough memory for a given ML application without unexpectedly facing an out-of-memory (OOM) problem sometime during program execution.

We have demonstrated and validated this new technique using a prognostic ML process called the multivariate state estimation technique 2 (MSET2), which was deployed on platform equipped with a set of GPUs. This new technique provides throughput acceleration and unprecedented reductions in computational latencies for large-scale ML prognostics for dense-sensor fleets of assets in fields of use, such as: utilities, oil & gas, commercial aviation and prognostic cybersecurity for datacenter assets, while achieving ultra-low false alarm probabilities (FAPs) and missed alarm probabilities (MAPs) for streaming ML prognostic use cases.

This new technique makes use of a memory sizing formularization that produces accurate peak memory footprint estimates for various ML datasets and techniques, while requiring almost no compute time, and without having to go through exhaustive pre-allocation of memory assessments. This enables the memory capacity and/or GPU shape of the VM to be autonomously and optimally sized beforehand.

MSET2 has a deterministic mathematical structure, which can be natively adapted for execution on a GPU platform to harness the parallel-processing power of multiple GPUs. We deployed a natively adapted instance of MSET2 on a computing platform equipped with multiple GPUs, which each include 16 GB of onboard VRAM. Note that although the disclosed embodiments use MSET2, the methodology taught in this disclosure generally applies to any deterministic ML prognostic technique. Furthermore, the mathematical formulae in this disclosure were derived based on an adapted MSET2 instance to be run on a set of GPUs. The formulae will be slightly different depending on how the code is implemented, but can be easily and separately derived using the same methodology.

Similar to conventional ML prognostic techniques for time-series signals, MSET2 can be divided into two phases: training and testing. Moreover, we can characterize the deterministic part of memory utilization as a function of signal numbers, observation numbers, training vector numbers, and data precision. In addition, for certain memory footprint profiles that seem stochastic because of proprietary GPU library functions, we can perform a simple 2D curve-fitting operation between the input and output of the functions to model the memory utilization profiles.

The object of this new technique is to size the shape of GPU-capable VM. To satisfy this objective, only the peak memory utilization of the ML application is required, and the breakdowns of memory utilizations for all of the different prognostic operations are not required. However, we characterize all of the steps of the process for determining peak memory utilization to validate the robustness of our formularization for a range of sample sizes. Given an initial dataset comprising M samples and N signals, the breakdown of memory usage in both training and testing phases in units of MB is characterized and validated as follows. Note that the training phases of the MSET2 technique are renamed below to make the terminology comparable to the conventional non-linear regression for generalizability.

Load Training Data: (1)
$$4N * \frac{\tau}{\epsilon} + \alpha$$

Characterize Signals Dynamics: (2)
$$(4N + (N + nmem) * nmem) * \frac{\tau}{\epsilon} + \alpha$$

Solve Linear Regression: (3)
$$(4N + (N + 4.6nmem + 141) * nmem + 32962) * \frac{\tau}{\epsilon} + \alpha$$

Evaluate Model: (4)
$$((M + 4) * N + (N + nmem + M) * nmem + M) * \frac{\tau}{\epsilon} + \alpha$$

In the above equations, N represents the number of signals of the dataset, M represents the number of observations during surveillance, nmem represents the number of observations for training, $\tau$ represents the precision, which indicates a floating-point size (e.g., 8 bytes for double-precision and 4 bytes for single-precision), $\alpha$=443 MB is the fixed memory cost for the graphics platform library that we are using, and $\epsilon$ represents a KB to MB conversion factor, wherein $\epsilon$=1024.

During the testing phase of MSET2, the previously trained model is loaded and applied to the testing data to produce surveillance estimates, resulting in different memory utilization profiles that are formularized as follows.

Load Model: (5)
$$(4N + (N + nmem) * nmem) * \frac{\tau}{\epsilon} + \alpha$$

Produce Surveillance Estimates: (6)
$$((2M' + 4) * N + (2M' + N + nmem) * nmem + M') * \frac{\tau}{\epsilon} + \alpha$$

wherein M' is the number of observations in the testing data.

Figure 5:
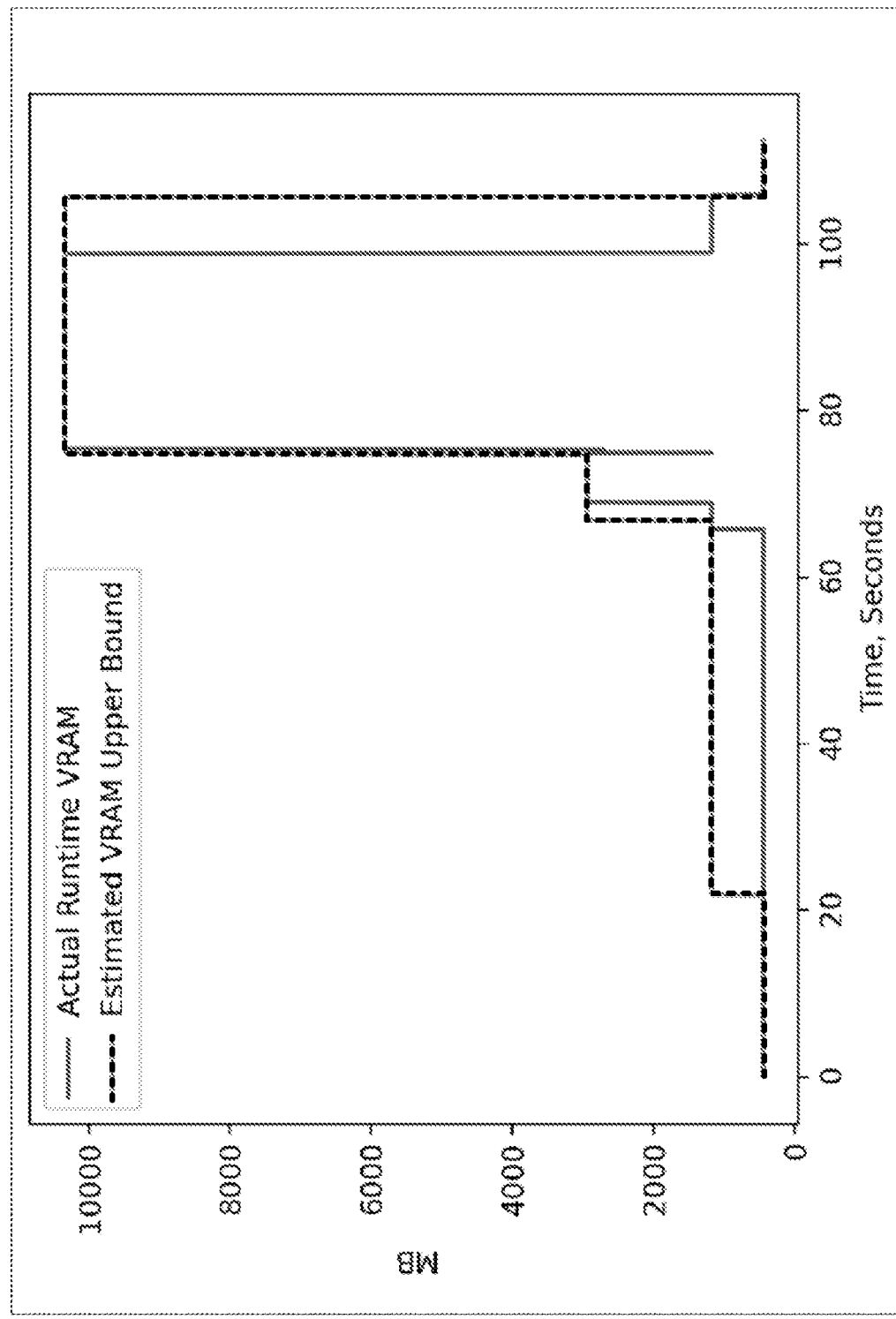
FIG. 5 presents a graph illustrating how a real measured memory utilization profile is upper-bounded by an analytically estimated memory utilization profile during a training phase in accordance with the disclosed embodiments.

To validate the proposed memory utilization formularization, we formulated a predictive maintenance use case with real IoT signals from the oil & gas industry on a testbed equipped with GPUs. This use case has: N=4K signals, nmem=100K observations for training, N=80K observations for prognostic surveillance, and $\tau$=8 bytes for double-precision. (Note that we can use nmem=8K for a lightweight model.) Although the peak memory use is of the most interest, we track down the memory use in each step of the training process to verify whether the formula is robust under any circumstance. Comparisons between the analytical memory utilization estimates and the actual utilization numbers are presented in FIG. 5. Our estimates were able to provide an upper bound for the actual utilization numbers throughout the training processes with some timing offsets due to the communications and data transfer between CPU and GPU. However, it is important to note that the peak memory utilization was accurately predicted with trivial residuals (0.04%).

Figure 6:
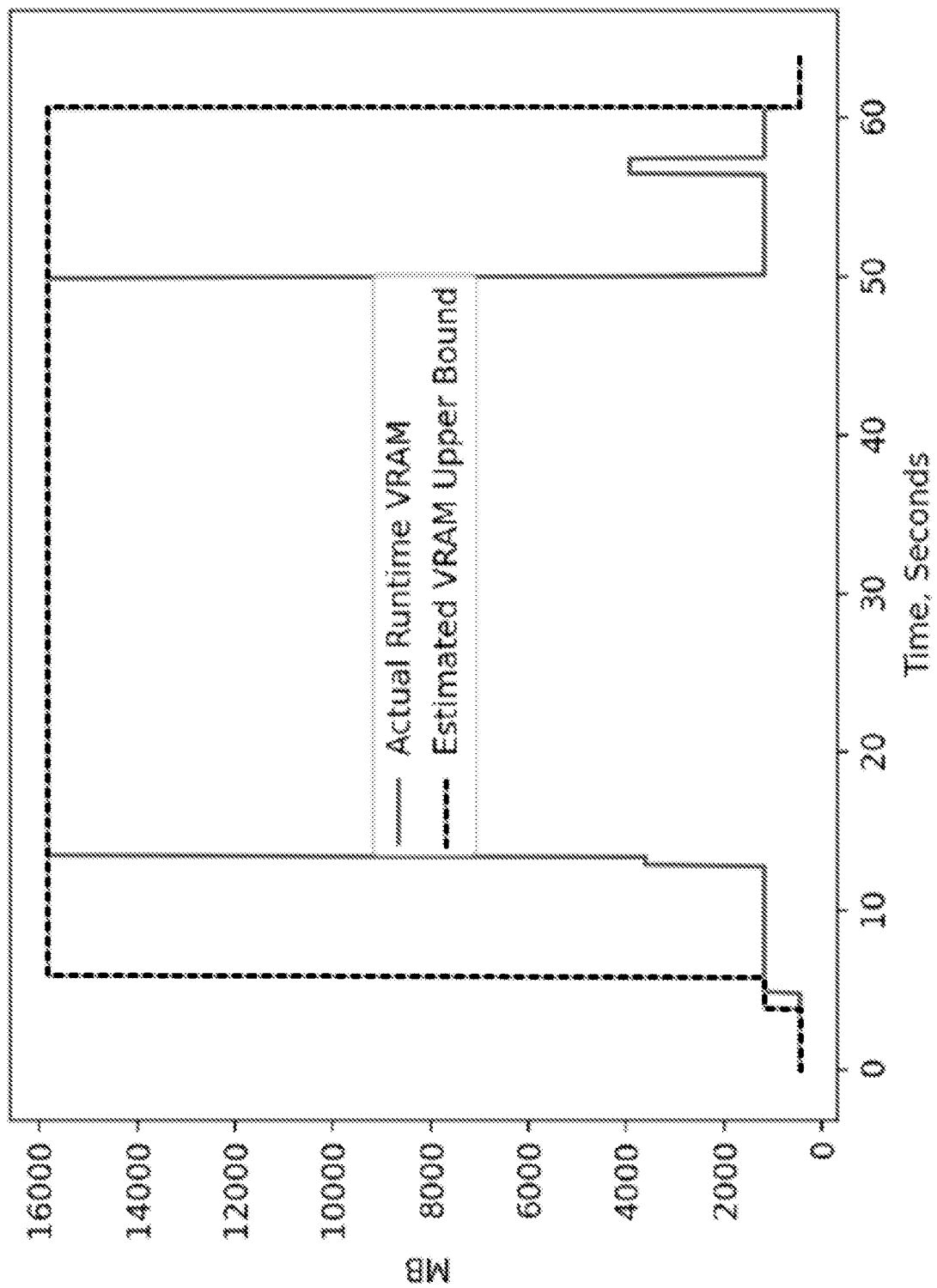
FIG. 6 presents a graph illustrating how peak memory utilization estimates align with actual memory utilization measurements during a surveillance phase in accordance with the disclosed embodiments.

During operation, we perform the prognostic-surveillance operations and produce associated estimates using the pre-trained model. The memory utilization profile during this program run was generated and compared to the analytical estimates as is illustrated in the graph that appears in FIG. 6.

Again, our estimates match the real numbers very well and the peak value is perfectly predicted with less than 0.04% residuals. During the surveillance phase, the peak memory usage was found to be about 15.46 GB, which almost reaches the VRAM capacity of the GPU. It is crucial to know this beforehand, because it helps us with sizing the shape of the VM, which involves pre-allocating additional GPUs for the surveillance dataset for a larger problem instance.

Memory Footprint Estimation and Code Generation

Figure 7:
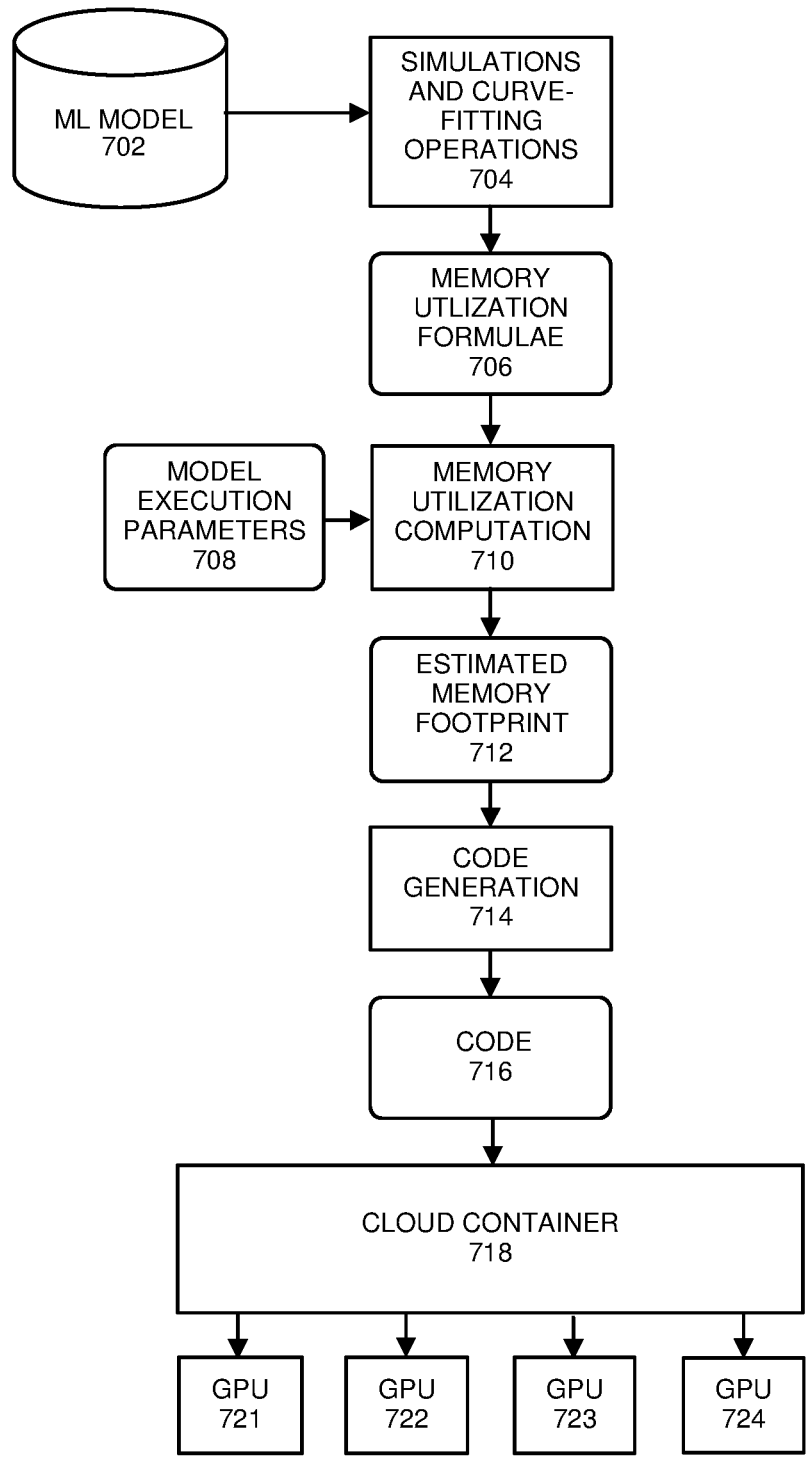
FIG. 7 presents a diagram illustrating how a memory footprint is estimated and used to generate code for a GPU-embedded cloud container in accordance with the disclosed embodiments.

FIG. 7 presents a diagram illustrating how a memory footprint is estimated and used to generate code for a GPU-embedded cloud container in accordance with the disclosed embodiments. The system starts with a specific ML model 702, such as MSET2. The system then performs various simulations and curve-fitting operations 704 to produce a set of memory utilization formulae 706. Next, the memory utilization formulae 706 and a specific set of model execution parameters 708 are used to perform a memory utilization computation 710 to produce an estimated memory footprint 712. This estimated memory footprint 712 is then used during an automated or manual code generation operation 714 to produce code 716 (which is possibly parallel) to execute the model 702 using a required number of GPUs. The code 716 is then incorporated into a cloud container 718 to be executed on a set of GPUs 721-724.

Executing an Inference Model Based on an Estimated Memory Footprint

Figure 8:
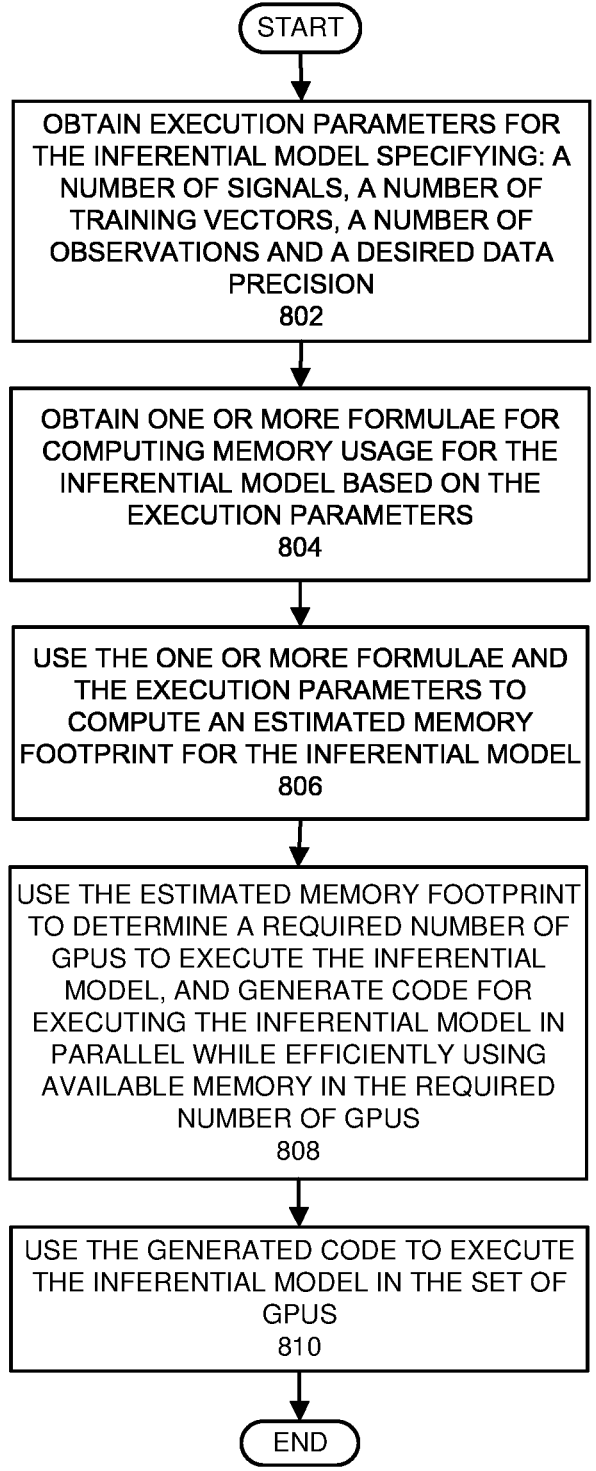
FIG. 8 presents a flow chart illustrating a process for executing an inferential model in VRAM embedded in a set of GPUs in accordance with the disclosed embodiments.

FIG. 8 presents a flow chart illustrating a process for executing an inferential model in VRAM embedded in a set of GPUs in accordance with the disclosed embodiments. During operation, the system obtains execution parameters for the inferential model specifying: a number of signals, a number of training vectors, a number of observations and a desired data precision (step 802). The system also obtains one or more formulae for computing memory usage for the inferential model based on the execution parameters (step 804). Next, the system uses the one or more formulae and the execution parameters to compute an estimated memory footprint for the inferential model (step 806). The system then uses the estimated memory footprint to determine a required number of GPUs to execute the inferential model, and generates code for executing the inferential model in parallel while efficiently using available memory in the required number of GPUs (step 808). Finally, the system uses the generated code to execute the inferential model in the set of GPUs (step 810).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method comprising:
executing an inferential model in parallel in VRAM of a required number of graphics-processing units (GPUs), wherein the required number of GPUs is based on a memory footprint for the inferential model during a loading of training data for the inferential model, wherein the memory footprint is based on one or more formulae and a plurality of execution parameters for the inferential model, wherein the one or more formulae are based on the plurality of execution parameters, and wherein the plurality of execution parameters specify a number of signals, a number of training vectors, a number of observations, and a desired data precision.

2. The method of claim 1, wherein the inferential model comprises one of the following:
a kernel regression model;
a linear regression model; and
a multivariate state estimation technique (MSET) model.

3. The method of claim 1, wherein the one or more formulae is based on scatter plots of memory usage for different executions of the inferential model based on different execution parameters.

4. The method of claim 1, wherein the inferential model is executed using GPU-embedded cloud containers on a cloud computing platform that provides the required number of GPUs.

5. The method of claim 1, further comprising:
during a training mode,
training the inferential model using the training data, wherein the training data comprises time-series signals received from a monitored system; and
during a surveillance mode,
receiving surveillance data from the monitored system, wherein values for the time-series signals in the surveillance data are based on cross correlations between the time-series signals in the surveillance data based on the trained inferential model, wherein residuals are based on the values, and wherein incipient anomalies in the monitored system are based on the residuals.

6. The method of claim 5, wherein the incipient anomalies in the monitored system are further based on sequential probability ratio test (SPRT) alarms.

7. The method of claim 5, wherein the incipient anomalies in the monitored system are further based on one or more of the following:
an impending failure of the monitored system; and
a malicious-intrusion event in the monitored system.

8. A non-transitory computer-readable storage medium storing instructions that when executed by a computer cause the computer to perform a method, the method comprising:
executing an inferential model in parallel in VRAM of a required number of graphics-processing units (GPUs), wherein the required number of GPUs is based on a memory footprint for the inferential model during a loading of training data for the inferential model, wherein the memory footprint is based on one or more formulae and a plurality of execution parameters for the inferential model, wherein the one or more formulae are based on the plurality of execution parameters, and wherein the plurality of execution parameters specify a number of signals, a number of training vectors, a number of observations, and a desired data precision.

9. The non-transitory computer-readable storage medium of claim 8, wherein the inferential model comprises one of the following:
a kernel regression model;
a linear regression model; and
a multivariate state estimation technique (MSET) model.

10. The non-transitory computer-readable storage medium of claim 8, wherein the one or more formulae is based on scatter plots of memory usage for different executions of the inferential model based on different execution parameters.

11. The non-transitory computer-readable storage medium of claim 8, wherein the inferential model is executed using GPU-embedded cloud containers on a cloud computing platform that provides the GPUs.

12. The non-transitory computer-readable storage medium of claim 8, wherein:
during a training mode,
training the inferential model using the training data, wherein the training data comprises time-series signals received from a monitored system; and
during a surveillance mode,
receiving surveillance data from the monitored system, wherein values for the time-series signals in the surveillance data are based on cross correlations between the time-series signals in the surveillance data based on the trained inferential model, wherein residuals are based on the values, and wherein incipient anomalies in the monitored system are based on the residuals.

13. The non-transitory computer-readable storage medium of claim 12, wherein the incipient anomalies in the monitored system are further based on sequential probability ratio test (SPRT) alarms.

14. The non-transitory computer-readable storage medium of claim 12, wherein the incipient anomalies in the monitored system are further based on one or more of the following:
   an impending failure of the monitored system; and
   a malicious-intrusion event in the monitored system.

15. A system comprising:
   a computing system with one or more processors and one or more associated memories; and
   an execution mechanism that executes on the computing system, wherein during operation, wherein the execution mechanism:
   executes an inferential model in parallel in VRAM of a required number of graphics-processing units (GPUs) using the required number of GPUs, wherein the required number of GPUs is based on a memory footprint for the inferential model during a loading of training data for the inferential model, wherein the memory footprint is based on one or more formulae and a plurality of execution parameters for the inferential model, wherein the one or more formulae are based on the plurality of execution parameters, and wherein the plurality of execution parameters specify a number of signals, a number of training vectors, a number of observations, and a desired data precision.

16. The system of claim 15, wherein executing the inferential model comprises:
   during a training mode,
      training the inferential model using the training data, wherein the training data comprises time-series signals received from a monitored system; and
   during a surveillance mode,
      receiving surveillance data from the monitored system, wherein values for the time-series signals in the surveillance data are based on the time-series signals in the surveillance data based on the trained inferential model, wherein residuals are based on the values, and wherein incipient anomalies in the monitored system are based on the residuals.

17. The system of claim 15, wherein the inferential model comprises one of the following:
   a kernel regression model;
   a linear regression model; and
   a multivariate state estimation technique (MSET) model.

18. The system of claim 15, wherein the one or more formulae is based on scatter plots of memory usage for different executions of the inferential model based on different execution parameters.

19. The system of claim 15, wherein the inferential model is executed using GPU-embedded cloud containers on a cloud computing platform that provides the required number of GPUs.

* * * * *